(12) United States Patent
DeHart

(10) Patent No.: US 6,546,710 B1
(45) Date of Patent: Apr. 15, 2003

(54) LEAF AND GRASS CATCHING BAG FOR RIDING MOWERS

(76) Inventor: Damon H. DeHart, 31 Putnam Rd., Bedford, MA (US) 01730

( * ) Notice: Subject to any disclaimer, the term of this patent is extended or adjusted under 35 U.S.C. 154(b) by 0 days.

(21) Appl. No.: 09/721,814

(22) Filed: Nov. 24, 2000

(51) Int. Cl.$^7$ .......................... A01D 43/00; A01D 43/06
(52) U.S. Cl. ........................................... 56/202; 56/199
(58) Field of Search ........................ 56/202, 16.8, 16.6, 56/199, 203, 206

(56) References Cited

U.S. PATENT DOCUMENTS

| | | | | |
|---|---|---|---|---|
| 1,031,033 A | * | 7/1912 | Williams ..................... | 383/22 |
| 2,970,422 A | * | 2/1961 | Kroll et al. ................. | 56/202 |
| 2,973,614 A | * | 3/1961 | Horner et al. .............. | 56/320.2 |
| 3,047,998 A | * | 8/1962 | Leader et al. ............... | 56/202 |
| 3,133,396 A | * | 5/1964 | Leader ......................... | 56/202 |
| 3,374,612 A | * | 3/1968 | Leader ......................... | 56/202 |
| 3,387,346 A | * | 6/1968 | Hasenbank .................. | 24/270 |
| 3,574,272 A | * | 4/1971 | Krewson ..................... | 56/202 |
| 3,579,966 A | * | 5/1971 | Allina .......................... | 56/202 |
| 3,611,685 A | * | 10/1971 | Allina .......................... | 56/202 |
| 3,995,414 A | * | 12/1976 | Kerr et al. ................... | 56/202 |
| 4,084,948 A | * | 4/1978 | MacFarland ................ | 55/366 |
| 4,505,095 A | * | 3/1985 | Short, Sr. .................... | 56/202 |
| 4,598,536 A | * | 7/1986 | Langley ....................... | 56/202 |
| 4,601,315 A | * | 7/1986 | France ......................... | 141/231 |
| RE32,954 E | * | 6/1989 | Lamusga ..................... | 56/202 |
| 5,031,277 A | * | 7/1991 | Coker .......................... | 15/257.3 |

FOREIGN PATENT DOCUMENTS

| | | | | |
|---|---|---|---|---|
| JP | 409217713 | * | 8/1997 | ............ F16B/2/08 |
| JP | 2001104019 | * | 4/2001 | ........... F16G/11/14 |

* cited by examiner

*Primary Examiner*—Thomas B. Will
*Assistant Examiner*—Arpad Fabian Kovacs
(74) *Attorney, Agent, or Firm*—Kriegsman & Kriegsman

(57) ABSTRACT

A grass and leaf catcher for use with a riding mower in the form of a large bag of flexible material, having a generally conical shape. The bag has an opening around its first end, and another at the second end. The opening at the first end is generally circular, with a drawstring to facilitate attachment around the discharge tube and hood of the mower. A cleat in proximity to the opening allows for securing the drawstring. The opening at the second end is likewise secured by a drawstring and cleat combination, or by a hook-and-loop fastener. A mesh area in the surface of the bag relieves the pressure within the bag caused by the entry of air forced up the discharge tube by the action of the cutter blades of the mower.

6 Claims, 4 Drawing Sheets

LEAF AND GRASS CATCHING BAG FOR RIDING MOWERS

BACKGROUND—FIELD OF INVENTION

This invention relates to a device for catching leave and grass for use on riding mowers.

BACKGROUND—DESCRIPTION OF PRIOR ART

Riding lawn mowers are widely used throughout the United States. These mowers are generally used for cutting the grass on large lawns, and further for clipping and mulching leaves, and other organic material on such lawns.

The large amount of grass and other clippings collected makes it necessary to provide means to contain the clippings on the mower, and to easily transfer the clippings to other containers for disposal. Many prior-art riding mowers provide a rigid container 38 attached to the end of a discharge tube 14, as shown in FIG. 1. A hood 10 attached to the discharge tube provides an attachment point for a container 38, which may be rigid, semi-rigid, or flexible. Many of the prior art containers are cloth or plastic bags, with reinforcing members to keep the containers open. Some containers are designed to hold disposable bags, which are replaced when full. In these prior art systems, the air pressure in the mower deck 18, created by the mower blades creates an air flow, maintained by a pressure differential, which carries the clippings up the discharge tube and into the container.

Most of the prior-art containers suffer from the same disadvantage, however: they don't hold enough clippings to complete the job without emptying the container at least once before the job is completed, because the containers are not large enough. This is especially true when the mower is used to collect leaves in the fall, when the volume of material collected is substantially greater.

Increasing the container size offers several problems: first, if the container is suspended at the upper end of the discharge tube, the increased weight of a large container can destabilize the mower. Secondly, carrying a large container on the mower can be awkward, without increasing the size of the mower.

The present invention overcomes these problems by suspending a large, unsupported bag on the end of the discharge tube, which is inflated by the pressure of the air in the discharge tube. Because the bag drags on the ground behind the mower, its weight is partially supported by the ground, so that the mower does not become unstable as a result.

The method of attachment of the bag to the mower is simple and inexpensive, and will fit the mowers of a variety of manufacturers. Furthermore, the bag can be easily and quickly emptied and, if necessary, re-attached to the mower. Finally, the bag is easily folded into a small volume, and stored on a shelf or in a drawer.

SUMMARY OF THE INVENTION

It is a general object of the current invention to provide a leaf and grass catcher for a riding mower which has a substantially larger volume than currently-used leaf and grass catchers. It is a further general object to provide such a leaf and grass catcher which is inexpensive, easy to use, and does not require any modification of the riding mower to install. It is a specific object of the current invention to provide such a leaf and grass catcher in the form of a large bag, with pressure relief, which can be quickly and easily emptied, and which fits a wide variety of different riding mowers.

In accordance with one aspect of the current invention, a leaf and grass catcher for a riding mower of the type which contains a discharge tube having an upper end, includes a substantially conical bag having a first end and a second end, with an opening at each end. The bag is of sufficient size to touch the ground when attached at the first end in proximity to the discharge tube. The invention includes means for attaching the bag about the upper end of the discharge tube, and means for opening and closing the second end of the bag.

In accordance with a second aspect of the invention, whereby the mower creates an area of increased air pressure in proximity with the upper end of the discharge tube, the invention includes means to decrease the increased air pressure in the bag.

In accordance with a third aspect of the invention, the means for decreasing the increased air pressure consists of a mesh area contained in the surface of the bag.

In accordance with a fourth aspect of the invention, in which the mower includes a hood, the means for attaching the bag about the upper end of the discharge tube includes means to attach the bag about the hood.

In accordance with a fifth aspect of the invention, the means of attaching the bag about discharge tube includes drawstring disposed about the opening in the first end of the bag.

In accordance with a sixth aspect of the invention, the means of attaching the bag about discharge tube includes a cleat attached to the bag in proximity to the opening at the upper end of the bag. The cleat containing at least two holes through which the draw string passes, so that the each end of the drawstring passes from the inside of the bag through one of the holes in the cleat, through the outside of the bag, and around the cleat.

In accordance with a seventh aspect of the invention, the cleat is attached to the bag by two or more rivets, each rivet containing a hole through which the drawstring may be lead.

In accordance with a eighth aspect of the invention, a reinforced area attached to the first end of the bag in proximity to the opening at the first end, through which the drawstring passes.

In accordance with a ninth aspect of the invention, the means for opening and closing the second end of the bag includes a drawstring disposed about the opening at the second end of the bag.

In accordance with a tenth aspect of the invention, the means of opening and closing the second end of the bag includes a cleat attached to the bag in proximity to the second end. The cleat contains at least two holes through which the draw string passes, so that the each end of the drawstring passes from the inside of the bag through one of the holes in the cleat, through the outside of the bag, and around the cleat.

In accordance with an eleventh aspect of the invention, the means for opening and closing the second end of the bag includes loop-and-hook fasteners.

DESCRIPTION OF DRAWINGS

These, and further features of the invention, may be better understood with reference to the accompanying specification and drawings depicting the preferred embodiment, in which.

DESCRIPTION OF THE PREFERRED EMBODIMENT

Figure 1:
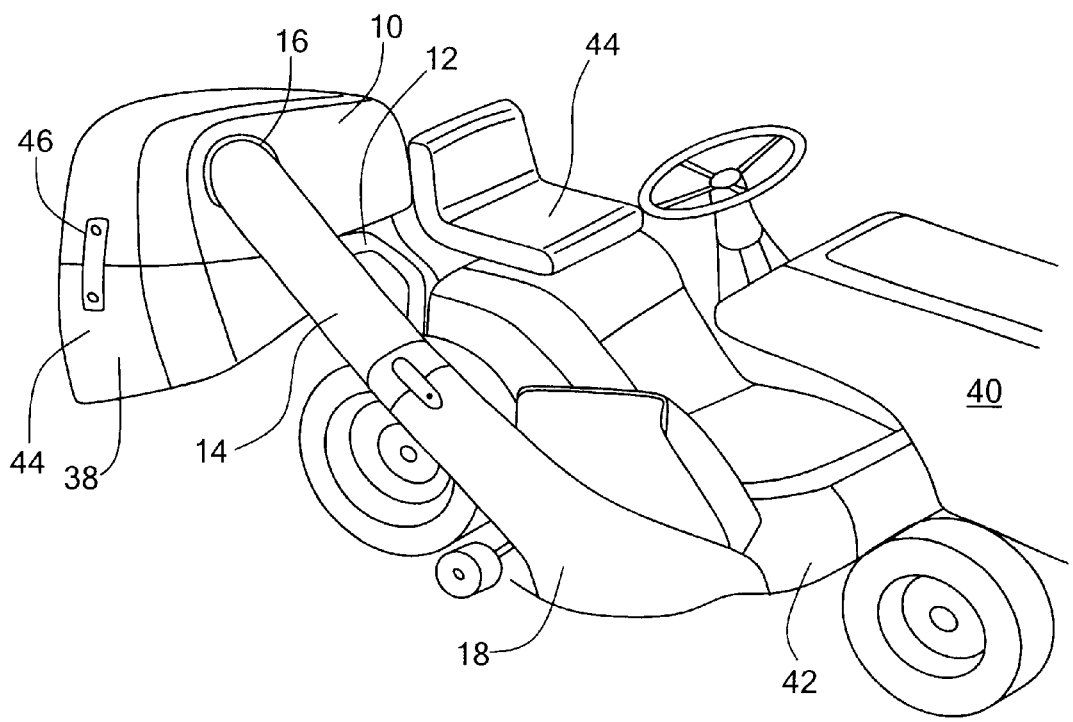
FIG. 1 depicts a perspective view of the riding mower in accordance with the prior art.

Before describing the current invention, the prior art will be briefly reviewed. Referring first to FIG. 1, a common garden tractor system adapted for mowing lawns, mulching leaves, and similar purposes, includes the tractor 40, having a mower deck 42 which contains rotating mower blades (not shown).

The material cut up by the mower blades is directed up a discharge tube 14, and thence to a hood 10, which is supported by brackets 12. The brackets are attached at the other end to the body of the tractor in proximity to the tractor seat 44. A seal 16 is located where the discharge tube 14 enters the hood, and prevents leakage of the air and the ground-up grass, leaves, and other material which is blown up the tube. In the current embodiment of the prior art depicted in FIG. 1 the discharge tube joined to the mower deck by a deck collector 18.

In the embodiment of the prior art depicted in FIG. 1, the clipping container 38 is attached to the hood by means of quick-disconnect clamps 46. When in use, the clipping container is un-clamped from the hood when the container becomes full, and then is re-clamped onto the hood before continuing the mowing operation. In this embodiment of the prior art the hood and clipping container are molded from a rigid, or semi-rigid plastic.

As previously mentioned, this system works by creating an air flow from the mower deck 42, up the deck collector 18, into the discharge tube 14, and thence to the hood and clipping collector. This airflow is generated and maintained by the mower blades, which act as a fan, and compress the air, forming an area of higher pressure at the mower deck, and creating an airflow up the container and discharge tube. This air flow is critical to the current invention.

The system described and depicted in FIG. 1 is limited as shown to the quantity of clippings which may be contained within the clipping container 38. There is an obvious limit to the size of the clipping container which can be safely suspended from the hood. If the clipping container is too large, excess weight from the clippings will unbalance the system, causing the front end of the tractor, or riding mower, to raise dangerously. The collection of leaves is particularly bothersome in the use of the clipping container 38. Leaves do not compact tightly, fill up the clipping container quickly, and require excess stops to frequently empty the clipping container.

Figure 2:
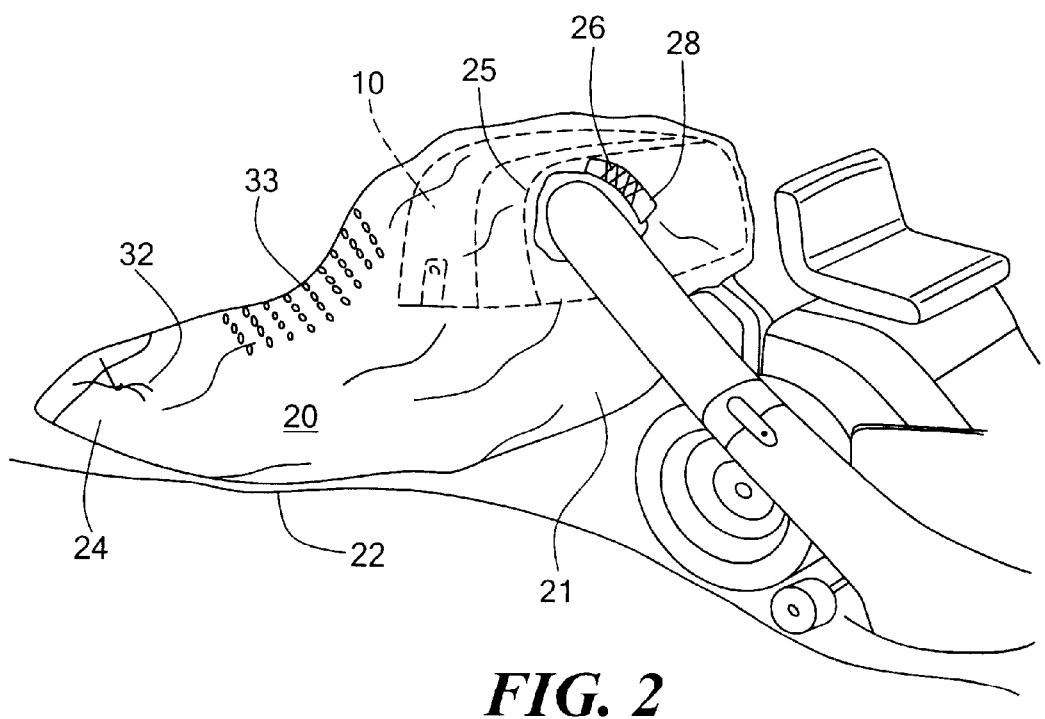
FIG. 2 depicts a perspective view of the current invention, the leaf and grass catcher bag, affixed to the riding mower.

The current invention is depicted in the perspective drawing of FIG. 2. The clipping container has been removed, and replaced by a clipping bag 20. This clipping bag is supported by the hood (shown in phantom in FIG. 2) 10 which remains in place to provide such support.

Figure 3:
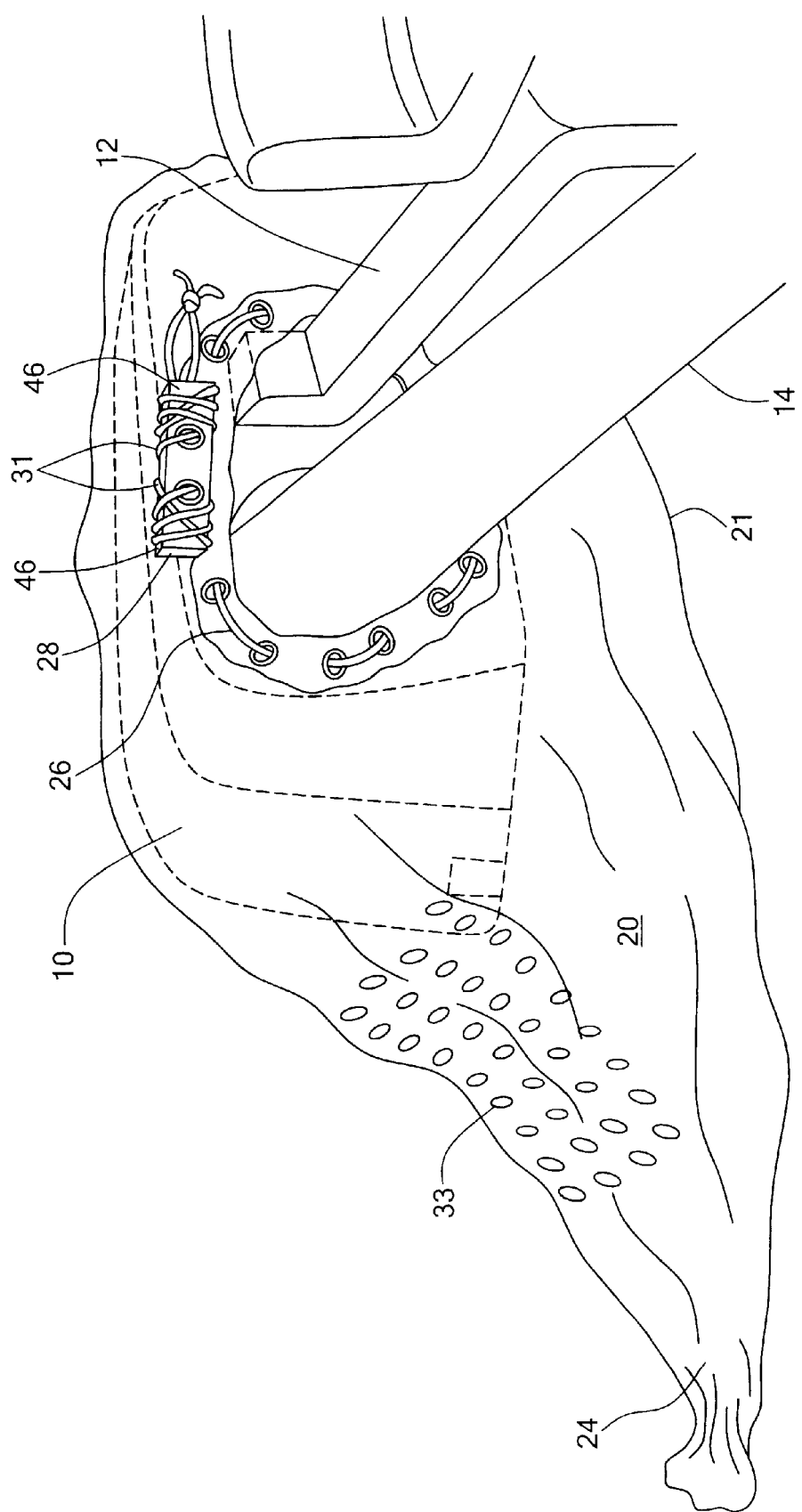
FIG. 3 depicts a close-up perspective view of the leaf and grass catcher bag of FIG. 2, showing the point of attachment to the mower.

The junction between the clipping bag and the discharge tube is depicted in the detail of FIG. 3. This junction is closed off by drawstring 26, which is let through a reinforcing ring, made of leather, plastic, or other flexible material, and which is bonded to the material of the bag. Alternatively, the reinforcing ring may be integrated into the material of the bag. Typically, grommets or rivets are inserted through the reinforcing material to provide entries for the drawstring to enter and exit the bag. The drawstring is secured by wrapping the excess string about cleat 28. The cleat is attached to the bag by two rivets 31, having central holes through which the drawstring is led. The drawstring is led into the bag at the grommets or rivets closest to the cleat, and then out of the bag through the rivet of the cleat itself The excess string is then wound around the arms 46 of the cleat. Still referring to FIG. 3, it is noted that the drawstring encloses both the discharge tube 14, and the support brackets 12. Although there is not a total seal at this junction, experimentation has demonstrated that the small amount of leakage at this point does not negatively affect the operation of the invention.

In fact, even with the amount of leakage provided by this junction, the pressure of the air within the clipping bag is sufficient that it must be relieved or the system will not operate, since, without a means to relieve the pressure in the bag, there will be no pressure differential to propel the clippings upward through the discharge tube. Thus, the mesh 33 at the area around the middle of the clipping bag allows the excess air to exit at this point. The mesh is sufficiently fine that the clippings and other material do not exit at this point. Even with the additional exhaust of air pressure by the mesh 33, there is still sufficient air pressure within the clipping bag to cause it to balloon to the general shape of a cone.

The ballooning of the clipping bag maximizes clippings capacity. The slope 21 assists the clippings to slide toward the small end 24. This further assures that the full capacity of the clipping bag will be utilized before it needs to be emptied. The conical shape of the clipping bag enhances maneuverability of the tractor. As the tractor takes an inside turn around an obstruction, such as a flower bed, the small end of the conically-shaped clipping bag is less likely to hit the obstruction.

Referring again to FIG. 2, it is noted that the clipping bag is substantially larger at the end near the collection tube than at this other end.

This configuration provides for optimum configuration for the system, since the bag 20 is suspended on top by the hood, the clipping bag at the large end 25 must be of sufficient circumference to accommodate a variety of hood sizes provided by different tractor manufacturers. The clipping bag is supported at the bottom by the ground 22. Since the ground provides support for the clippings in the clipping bag, the tractor will not become unbalanced.

The clipping bag is also provided with an opening at the smaller, or ground, end, allowing the user to remove the clippings, mulch, or other material, without removing the clipping bag from the discharge tube. This opening is provided with a simple means to close off the opening.

Figure 4:
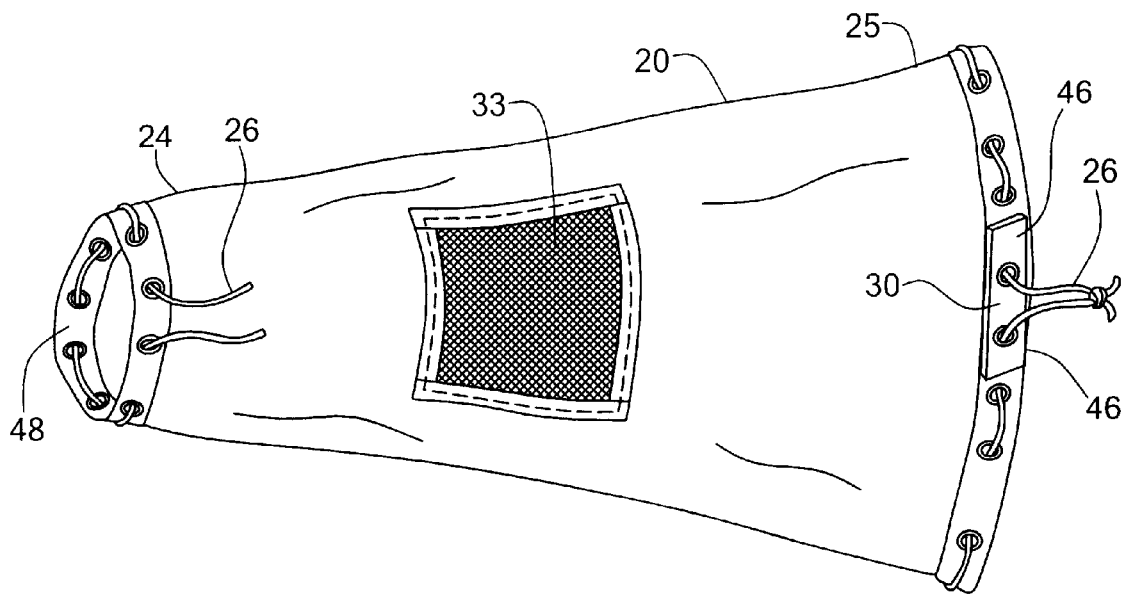
FIG. 4 depicts a perspective view of the leaf and grass catcher bag, unattached to the mower.

FIG. 4 discloses the details of this opening 48, which appears at the small end 24 of the clipping bag 20. As seen in this figure, when not installed, the clipping bag forms a flat cone with a large end 22 and a small end 24. This flat form of the clipping bag is easy to fold compactly and takes up very little storage space. FIG. 4 depicts details of the draw string 26, as well as the cleat 30, used for securing the drawstring.

Figure 4A:
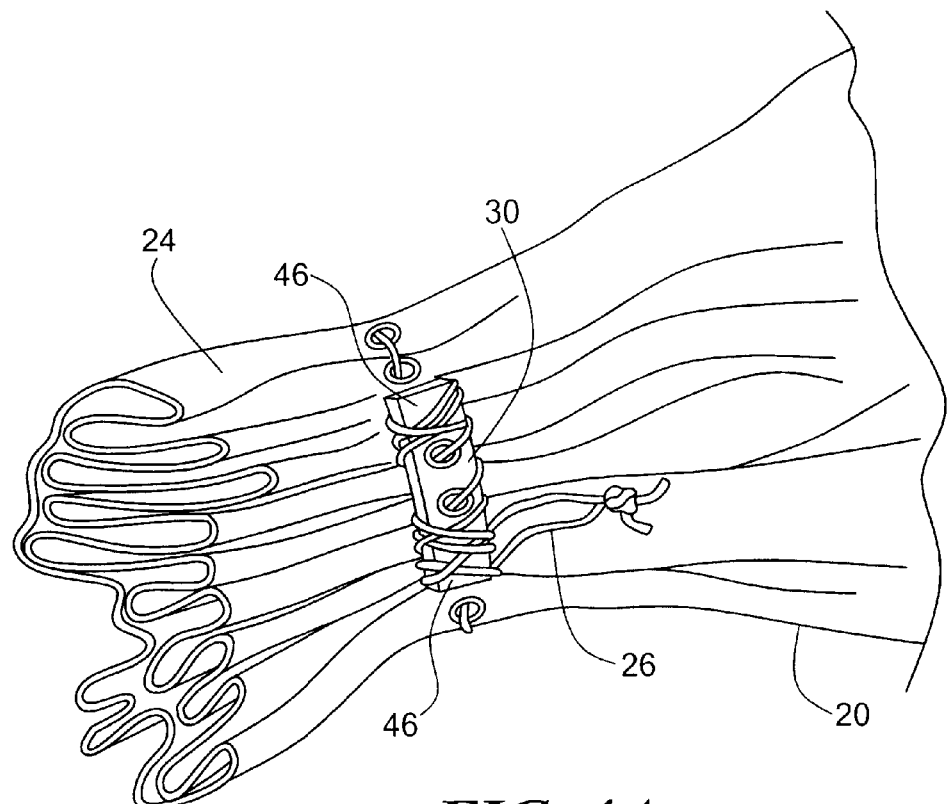
FIG. 4A depicts a perspective view of the small end of the leaf and grass catcher bag, with a draw-string embodiment for closing off the small end.

In addition, FIG. 4 shows the detail of the closure at the rear, or small end 24 of the clipping bag. In the embodiment shown in this figure, the small end is simply gathered together by the small-end drawstring, which is simply knotted by a bow, or other quick-release knot. In an alternated embodiment, as shown in FIG. 4a, the small end is simply gathered together with the drawstring 26, then wound around a second cleat 30.

Figure 4B:
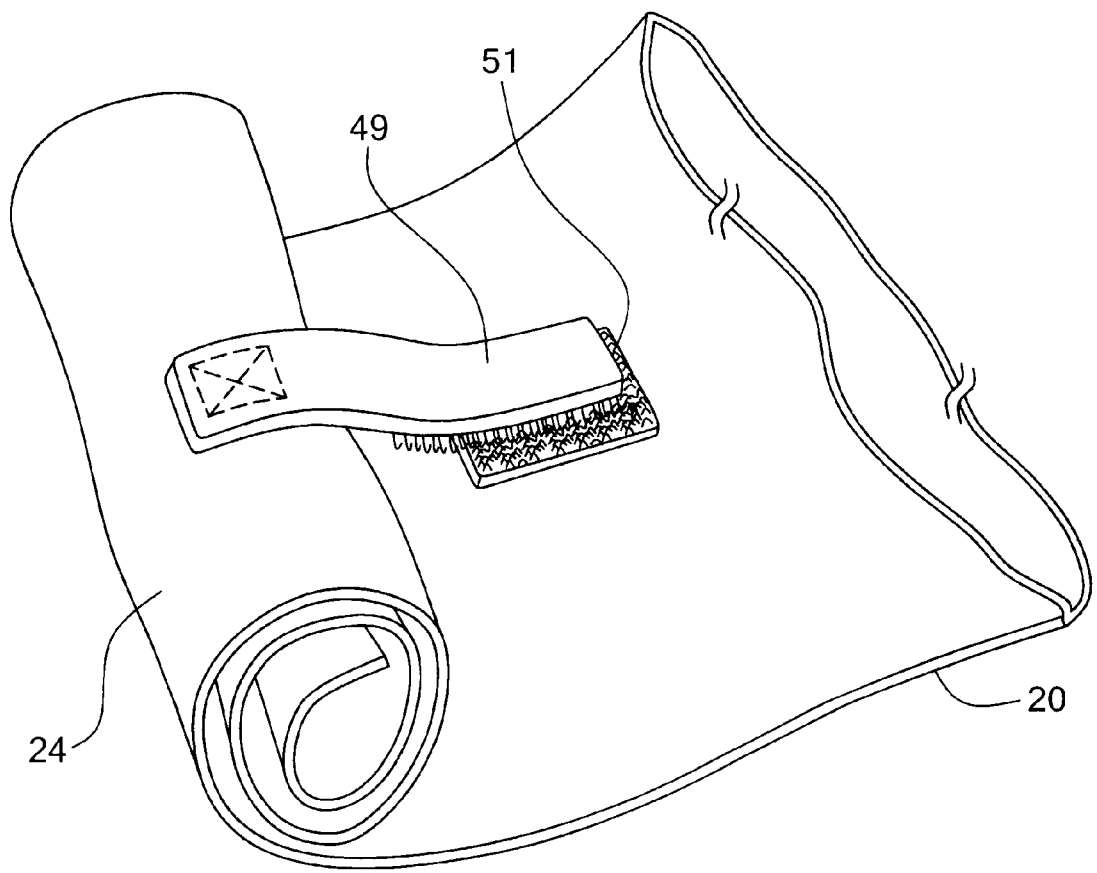
FIG. 4B depicts a perspective view of the small end of the leaf and grass catcher bag, with a hook-and-loop fastener embodiment for closing off the small end.

FIG. 4b shows and alternative embodiment of the small end closure, in which the small end is rolled up, and then attached to the body of the clipping bag by a strip 49 containing one side of a VELCRO®, or hook-and-loop fastener. The other side of the VELCRO is in the shape of a rectangle 51, and is attached to the clipping bag, as shown.

Referring again to FIG. 2, the invention functions with the assistance of the air flow generated by the mower blades, and discharging into the clipping bag 20 through the hood 10. This airflow acts to slightly inflate the clipping bag, and the mesh 33, which consists of small holes in the embodiment of FIGS. 2 and 3. An alternative embodiment of the mesh is depicted in FIG. 4, where the mesh is actually a fine wire or plastic mesh, wherein the size of the interstices between the wires is of the same order of magnitude as the size of the wire.

The shape of the clipping bag is described in the first preferred embodiment as substantially conical, with the first end attached at the mower hood, and the second end trailing on the ground. This geometry provides some advantages, concerning obstructions on the ground, and in the case of a rough ground surface where the footprint of the portion of the clipping bag dragging on the ground should be minimized.

However, it is not necessarily that the clipping bag be conical. Other embodiments of the invention have bags of different shapes, and, except for cases when a small ground footprint is desired, many different shapes provide acceptable performance. In particular, it has been found that a substantially cylindrical shape performs well, and does a cylinder terminated by a short cone at the end which trails on the ground.

In still other embodiments, the clipping bag contains only one opening: that by which the bag is attached about the hood, or discharge tube. Although an opening in the other, or ground end may be preferred by some users as a means to empty the clipping bag of clippings, it has been found that the opening at the discharge tube provides easier emptying of the bag, especially when the clipping bag is conical in shape, or when it is substantially larger at the end in proximity to the discharge tube. The use of a drawstring and cleat for securing this larger end allows the user to quickly remove the bag, empty it, and then replace it on the hood.

As depicted in FIG. 2, the volume of material held by the clipping bag is many times that of the clipping container. Thus, it need not be emptied nearly as often. The clipping bag, inflated by the action of the air pressure mounting through the discharge tube 14, rides easily on the mower itself, with the additional weight of the leaves supported by the ground 22.

Furthermore, the heavy clipping container of the prior embodiment is no longer present, further reducing the weight acting at the point of the hood.

The mower, fitted with the present invention, provide a substantial improvement over the use of the clipping container, for the reasons shown above.

While the invention has been described with reference to specific embodiments, it will be apparent that improvements and modifications may be made within the purview of the invention without departing from the scope of the invention defined in the appended claims.

I claim:
1. A riding lawn mower comprising:
   a. a tractor having a mower deck in which grass is cut,
   b. an upwardly extending deck collector joined to the mower deck for conveying away from the mower deck grass cut in the mower deck, the deck collector having an upper end,
   c. an upwardly extending discharge tube for receiving grass conveyed by the deck collector, the discharge tube having an upper end and a lower end, the lower end being connected to the upper end of the deck collector,
   d. a hood mounted on the upper end of the discharge chute for redirecting downward grass received by the discharge tube and discharged by the discharge tube through its upper end, the hood having a top, a side and an open bottom, grass entering the hood from the discharge tube passing out of the hood through the open bottom,
   e. the mower deck creating an area of increased air pressure in proximity with the upper end of the discharge tube during operation of the riding lawn mower,
   f. means on the tractor for supporting the hood,
   g. clipping bag for collecting grass cut by the mower deck, the clipping bag having a first end and a second end, the first end having an opening, the clipping bag having a surface which is made of non-pervious material except for a portion between the first end and the second end which is made of mesh, the mesh portion relieving the pressure within the clipping bag caused by air forced up the discharge tube by the mower deck,
   h. the clipping bag extending completely over the hood through the opening at the first end of the clipping bag so that the hood is completely inside the clipping bag, the clipping bag being removably mounted on the discharge tube through the opening at the first end of the clipping bag, and
   i. means for closing off the opening at the first end of the clipping bag around the discharge chute to secure the clipping bag onto the discharge chute,
   j. wherein grass cut in the mower deck and passing out through the discharge chute will be redirected by the hood into the clipping bag for collection.

2. The riding lawn mower of claim 1 wherein the second end of the clipping bag includes an opening.

3. The riding lawn mower of claim 2 further including means for closing off the opening at the second end of the clipping bag.

4. The riding lawn mower of claim 3 wherein the means foreclosing off the first end of the clipping bag comprises a drawstring.

5. The riding lawn mower of claim 4 wherein the means for closing off the second end of the clipping bag comprises a drawstring.

6. The riding lawn mower of claim 5 further comprising a bracket mounted on the tractor and the hood for supporting the hood.

* * * * *